US012423728B2

(12) United States Patent
Hubbard et al.

(10) Patent No.: US 12,423,728 B2
(45) Date of Patent: Sep. 23, 2025

(54) SELECTION OF KEYWORD PHRASES FOR PROVIDING CONTEXTUALLY RELEVANT CONTENT TO USERS

(71) Applicant: TAMIRAS PER PTE. LTD., LLC, Wilmington, DE (US)

(72) Inventors: Sid J. A. Hubbard, San Francisco, CA (US); Robin D. Stevens, Santa Clara, CA (US)

(73) Assignee: eComm Innovations, LLC, Milton, GA (US)

( * ) Notice: Subject to any disclaimer, the term of this patent is extended or adjusted under 35 U.S.C. 154(b) by 413 days.

(21) Appl. No.: 16/240,631

(22) Filed: Jan. 4, 2019

(65) Prior Publication Data

US 2019/0311400 A1 Oct. 10, 2019

Related U.S. Application Data

(63) Continuation of application No. 15/219,010, filed on Jul. 25, 2016, now Pat. No. 10,176,495, which is a
(Continued)

(51) Int. Cl.
*G06F 40/134* (2020.01)
*G06F 3/04842* (2022.01)
(Continued)

(52) U.S. Cl.
CPC ..... *G06Q 30/0254* (2013.01); *G06F 3/04842* (2013.01); *G06F 3/04847* (2013.01); *G06F 16/24575* (2019.01); *G06F 16/24578* (2019.01); *G06F 16/9538* (2019.01); *G06F 16/9558* (2019.01); *G06F 40/134* (2020.01);
(Continued)

(58) Field of Classification Search
CPC ............. G06F 16/9558; G06F 16/9538; G06F 3/04842
See application file for complete search history.

(56) References Cited

U.S. PATENT DOCUMENTS 5,708,825 A    1/1998  Sotomayor
6,356,908 B1 *  3/2002  Brown .................. G06F 16/957
(Continued)

OTHER PUBLICATIONS

New York Times article titled, "How to Use Google Trends," by David Leonhardt, dated Jul. 5, 2006, printed from nytimes.com web site at http://nytimes.com/2006/07/05/business/05lleonhardt-aboutgoogtrends.html, 2 pp.
(Continued)

*Primary Examiner* — Marc S Somers
(74) *Attorney, Agent, or Firm* — Meunier Carlin & Curfman LLC

(57) ABSTRACT

A process is described for assessing the suitability of particular keyword phrases for use in serving contextually relevant content for display on pages of network-accessible sites. In one embodiment, the process involves scoring the key phrases based in part on collected user behavioral data, such as view counts of associated social media content items. A process is also disclosed in which selected keyword phrases on a page are transformed into links that can be selected by a user to view bundled content that is related to such keyword phrases.

20 Claims, 15 Drawing Sheets

Related U.S. Application Data continuation of application No. 14/546,744, filed on Nov. 18, 2014, now Pat. No. 9,418,374, which is a continuation of application No. 13/478,002, filed on May 22, 2012, now Pat. No. 8,909,639, which is a continuation of application No. 13/174,296, filed on Jun. 30, 2011, now Pat. No. 8,209,333, which is a continuation of application No. 12/016,887, filed on Jan. 18, 2008, now Pat. No. 8,073,850.

(60) Provisional application No. 60/885,853, filed on Jan. 19, 2007.

(51) Int. Cl.
  *G06F 3/04847* (2022.01)
  *G06F 16/2457* (2019.01)
  *G06F 16/9538* (2019.01)
  *G06F 16/955* (2019.01)
  *G06F 40/289* (2020.01)
  *G06Q 30/02* (2023.01)
  *G06Q 30/0241* (2023.01)
  *G06Q 30/0251* (2023.01)
  *G06F 16/33* (2025.01)
  *G06F 16/338* (2019.01)
  *G06Q 50/00* (2024.01)

(52) U.S. Cl.
  CPC .......... *G06F 40/289* (2020.01); *G06Q 30/02* (2013.01); *G06Q 30/0276* (2013.01); *G06Q 30/0277* (2013.01); *G06Q 50/01* (2013.01)

(56) References Cited

U.S. PATENT DOCUMENTS

| | | | |
|---|---|---|---|
| 6,421,675 | B1 | 7/2002 | Ryan |
| 6,563,514 | B1 | 5/2003 | Samar |
| 6,691,108 | B2 | 2/2004 | Li |
| 6,920,448 | B2 | 7/2005 | Kincaid |
| 7,174,513 | B1* | 2/2007 | Nickum ............ G06F 16/9574 715/838 |
| 7,428,522 | B1 | 9/2008 | Raghunathan |
| 7,752,534 | B2 | 7/2010 | Blanchard, III |
| 7,818,399 | B1 | 10/2010 | Ross, Jr. et al. |
| 7,975,019 | B1 | 7/2011 | Green |
| 7,975,020 | B1 | 7/2011 | Green |
| 8,073,850 | B1 | 12/2011 | Hubbard |
| 8,135,617 | B1 | 3/2012 | Agostino |
| 8,209,333 | B2 | 6/2012 | Hubbard |
| 8,909,639 | B2 | 12/2014 | Hubbard |
| 9,418,374 | B2 | 8/2016 | Hubbard |
| 10,176,495 | B2 | 1/2019 | Hubbard |
| 2001/0038395 | A1* | 11/2001 | Holtzblatt ........... G06F 16/9558 715/854 |
| 2002/0016786 | A1 | 2/2002 | Pitkow |
| 2002/0059574 | A1 | 5/2002 | Tudor |
| 2002/0099700 | A1* | 7/2002 | Li ......................... G06F 16/951 |
| 2002/0120505 | A1 | 8/2002 | Henkin |
| 2002/0129114 | A1* | 9/2002 | Sundaresan ............ H04L 67/36 709/213 |
| 2003/0120662 | A1 | 6/2003 | Vishik |
| 2004/0141016 | A1 | 7/2004 | Fukatsu |
| 2004/0181525 | A1 | 9/2004 | Itzhak |
| 2005/0004909 | A1 | 1/2005 | Stevenson |
| 2005/0033771 | A1* | 2/2005 | Schmitter ............. G06Q 30/02 |
| 2005/0137939 | A1 | 6/2005 | Calabria |
| 2005/0165753 | A1 | 7/2005 | Chen |
| 2005/0222901 | A1 | 10/2005 | Agarwal |
| 2006/0020523 | A1 | 1/2006 | Song |
| 2006/0053095 | A1 | 3/2006 | Koch |
| 2006/0242178 | A1 | 10/2006 | Butterfield ............ G06F 16/447 |
| 2007/0067267 | A1* | 3/2007 | Ives ...................... G06F 16/951 |
| 2007/0073756 | A1 | 3/2007 | Manhas |
| 2007/0143176 | A1 | 6/2007 | Nong |
| 2007/0244866 | A1 | 10/2007 | Mishkanian |
| 2007/0244900 | A1* | 10/2007 | Hopkins ............... G06F 16/954 |
| 2008/0120165 | A1* | 5/2008 | Yan .................... G06Q 30/0242 705/342 |
| 2008/0154847 | A1 | 6/2008 | Chellapilla |
| 2008/0172615 | A1 | 7/2008 | Igelman |
| 2011/0161161 | A1* | 6/2011 | Juda .................... G06Q 30/0243 705/14.42 |
| 2011/0258204 | A1 | 10/2011 | Hubbard |
| 2012/0290407 | A1 | 11/2012 | Hubbard |
| 2015/0066664 | A1 | 3/2015 | Hubbard |

OTHER PUBLICATIONS

SWW Listing of Related Cases, dated Jan. 6, 2020, 1 page.

* cited by examiner

| Back | Forward | Reload | Stop | Home | mywebsite.com |

Consoles and beyond

The 70's saw the advent of home video game consoles. The patent for Ralph Baer's Magnavox Odyssey was granted in 1972, and paved the way for the next wave of home consoles. The late 1970's to early 1980's brought about improvements to home consoles and the release of the Atari 2600, Intellivision and Colecovision. They enjoyed a successful number of years on the market, especially the Atari 2600. However, that soon came to Game Console
Game Console The video ga
consoles duri

ATARI 2600

Related Videos — More

*44*

(Photo)  (Photo)  (Photo)

Related Photos — More (Photo)  (Photo)  (Photo)

Google    Wikipedia    del.icio.us    Digg

Intextual

View my complete profile

Yahoo Videogames
Computers and Games
All-Time Worst Games
Sean Baby
Nintendo
Super Nintendo
Atari.org
Atari Museum
Wikipedia Arcade Games Consoles and beyond the 70's saw the advent of home The golden age of Arcade Games Pong helped bring.... Beginning The first primitive computer and video So, A computer game is a computer controlled game...

Publisher Logo

Create Ad

Title: My Advertisement

Ad Text: This is the text for my advertisement, after reading it you should want to click and go to my site and buy.

Link: http://myurl.com/mypag

Link Title: MyUrl.com

Ad Preview

My Advertisemnent
This is the text for my advertisement, after reading it you should want to click and go to my site and buy.

MyUrl.com

[ Next ]

*FIG. 6*

Publisher Logo

Campaign Summary

| Phrase | CPM | CPC |
|---|---|---|
| Word or Phrase | 10.00 | 1.00 |
| Word or Phrase | 5.00 | .50 |
| Word or Phrase | 6.00 | .60 |
| Word or Phrase | 5.00 | .50 |
| Word or Phrase | 6.00 | .60 |
| Word or Phrase | 5.00 | .50 |
| Word or Phrase | 6.00 | .60 |
| Word or Phrase | 5.00 | .50 |
| Word or Phrase | 6.00 | .60 |
| Word or Phrase | 5.00 | .50 |
| Word or Phrase | 6.00 | .60 |

| | CPM | CPC |
|---|---|---|
| Campaign Average | 10.90 | 1.09 |

Enter CPM Budget  50.00

Enter CPC Budget  50.00

Back    Next

FIG.8

Campaign Details

| Phrase |
|---|
| Word or Phrase |
| Word or Phrase |
| Word or Phrase |
| Word or Phrase |

| AVG CPM |
|---|
| 10.90 |

| AVG CPM |
|---|
| 1.09 |

Campaign Budget

| CPM | CPM |
|---|---|
| 50.00 | 50.00 |

Units Purchased

| Impressions | Clicks |
|---|---|
| 45,871 | 46 |

Campaign Total

| USD |
|---|
| 100.00 |

Credit Card Type: American Express

Billing Name:

Street Address:

Address 2:

City:

State: California

Zip:

(Back)  (Click To Purchase Campaign)

FIG. 9

SELECTION OF KEYWORD PHRASES FOR PROVIDING CONTEXTUALLY RELEVANT CONTENT TO USERS

RELATED APPLICATIONS

This application is a continuation U.S. application Ser. No. 15/219,010, filed Jul. 25, 2016, now pending, which is a continuation of U.S. application Ser. No. 14/546,744, filed Nov. 18, 2014, now U.S. Pat. No. 9,418,374, which is a continuation of U.S. application Ser. No. 13/478,002, filed May 22, 2012, now U.S. Pat. No. 8,909,639, which is a continuation of U.S. application Ser. No. 13/174,296, filed Jun. 30, 2011, now U.S. Pat. No. 8,209,333, which is a continuation of U.S. application Ser. No. 12/016,887, filed Jan. 18, 2008, now U.S. Pat. No. 8,073,850, which claims the benefit of U.S. Provisional Appl. No. 60/885,853, filed Jan. 19, 2007. Each of the disclosures of the aforesaid applications is hereby incorporated by reference in its entirety.

FIELD OF THE INVENTION

The present invention relates to computer-implemented processes for identifying the terms and/or phrases most suitable for serving contextually relevant content. The invention also relates to processes for serving contextually relevant content for display within web pages or other types of documents.

BACKGROUND

A variety of systems exist for selecting content, such as advertisements, to present on web pages based on the content of such web pages. These systems often fail to select content that is relevant to, or suitable for display on, the particular page at issue. For example, an ad for a particular product or company may be selected to display on a web page containing an article that is critical of that product or company. As another example, an ad for a particular product may be displayed on a page containing an article about a completely unrelated topic merely because the product is briefly mentioned in the article. Existing systems also frequently display the selected ad in a manner that is distracting to users. These and other issues contribute to a low industry-wide click through rate of less than 1%.

SUMMARY OF THE DISCLOSURE

A process is described for assessing the suitability of particular keyword phrases for use in serving contextually relevant content for display on pages of network-accessible sites. In one embodiment, the process involves scoring the key phrases based in part on collected user behavioral data, such as view counts of associated social media content items. A process is also disclosed in which selected keyword phrases on a page are transformed into links that can be selected by a user to view bundled content that is related to such keyword phrases.

BRIEF DESCRIPTION OF THE DRAWINGS

FIG. 3 illustrates how a panel may be presented on a web page in response to user selection of a keyword phrase that has been transformed into a user-selectable link.

FIG. 6 illustrates one example of a form page that may be used to create the ad campaign.

FIG. 8 illustrates a campaign summary page.

FIG. 9 illustrates a campaign purchase form.

DETAILED DESCRIPTION OF THE SPECIFIC EMBODIMENTS

A system that embodies various inventive features will now be described with reference to the drawings. Nothing in this description is intended to imply that any particular feature, characteristic, or component of the system or its use is essential to the invention.

I. Overview

Figure 1:
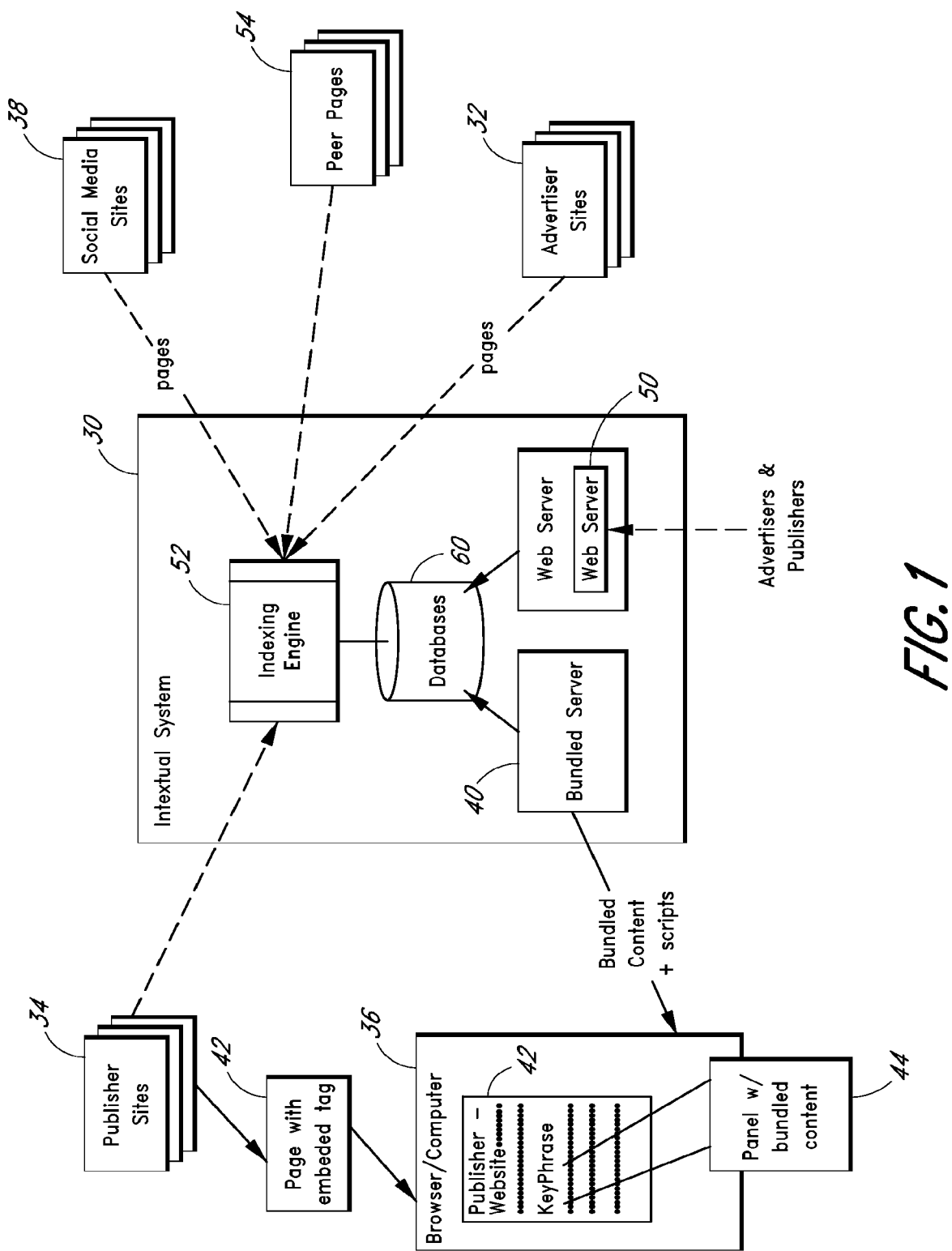
FIG. 1 illustrates a system for identifying and serving contextually relevant content according to one embodiment.

FIG. 1 illustrates the basic components of a system 30, referred to as the Intextual system, for acquiring and serving contextually relevant content for display on web pages. The figure also shows the various entities that interact with the Intextual system. These entities include the following: advertisers that operate advertiser web sites 32; publishers that operate publisher web sites 34 (i.e., sites that publish or syndicate content served by the Intextual system 30); end users that access the publisher sites 34 via browser software running on end user computing devices (one computer/browser 36 shown); and social content providers that upload social content (e.g., photos, videos, music, textual content, etc.) to one or more social media sites 38.

As illustrated, the Intextual system 30 (hereinafter "the system") includes a bundle server 40 that serves bundled content for display within, or in conjunction with, web pages 42 of the publisher sites 34. The bundled content is preferably displayed in association with specific key phrases that appear in pages of the publisher sites 34. (As used herein, a "key phrase" can be either a single term or a sequence of two or more terms.) As described below, the system 30 uses a novel process to select the key phrases that are likely to be the most effective for particular ads, advertisers and publishers. This process involves analyzing social media content obtained from one or more social media sites 38 to assess the popularity levels of particular key phrases.

Figure 2A:
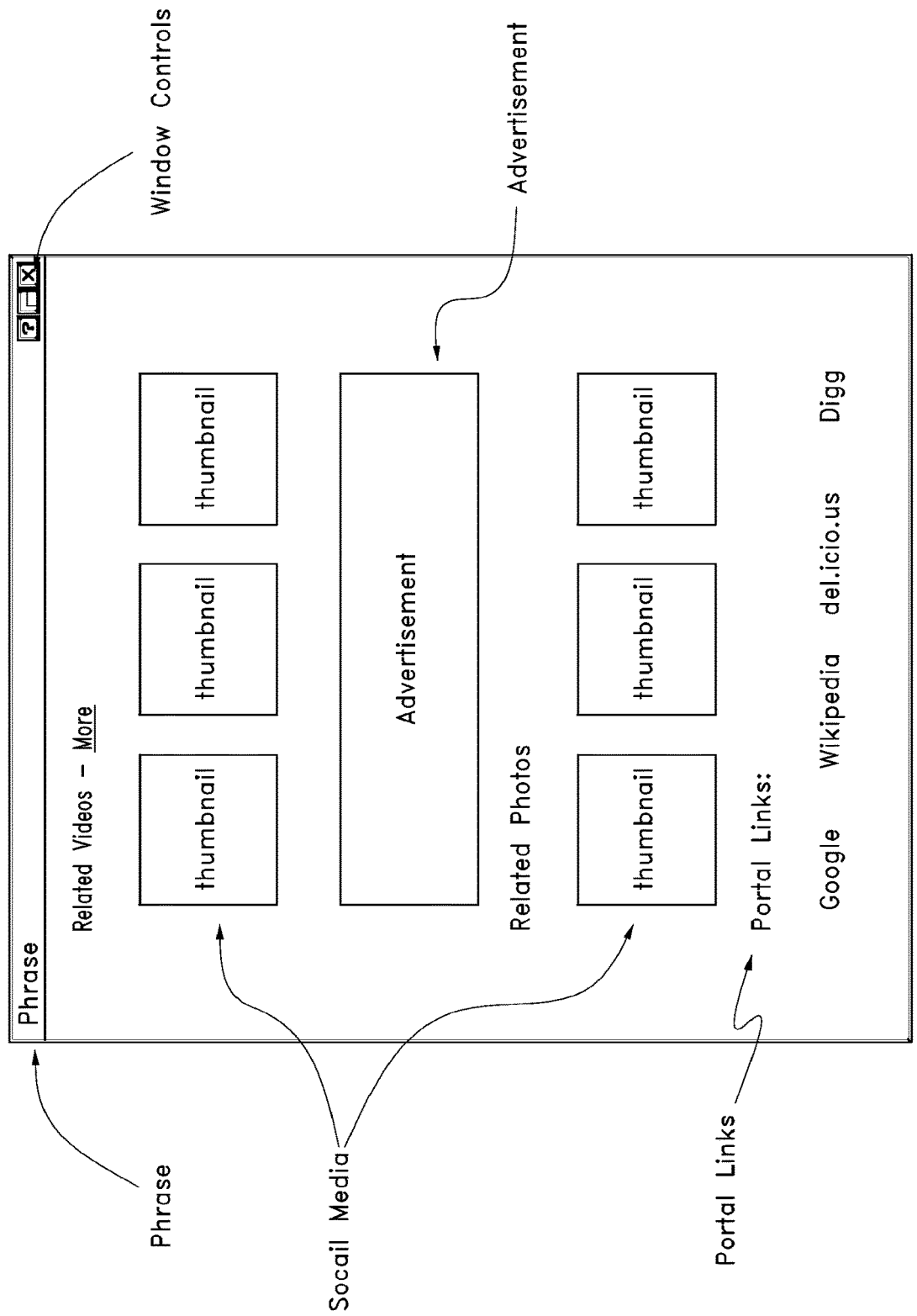
FIG. 2A-2C illustrates examples of a panel formats that may be used by the system of FIG. 1 to serve bundled content.
Figure 2B:
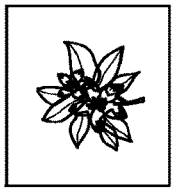
Figure 2C:
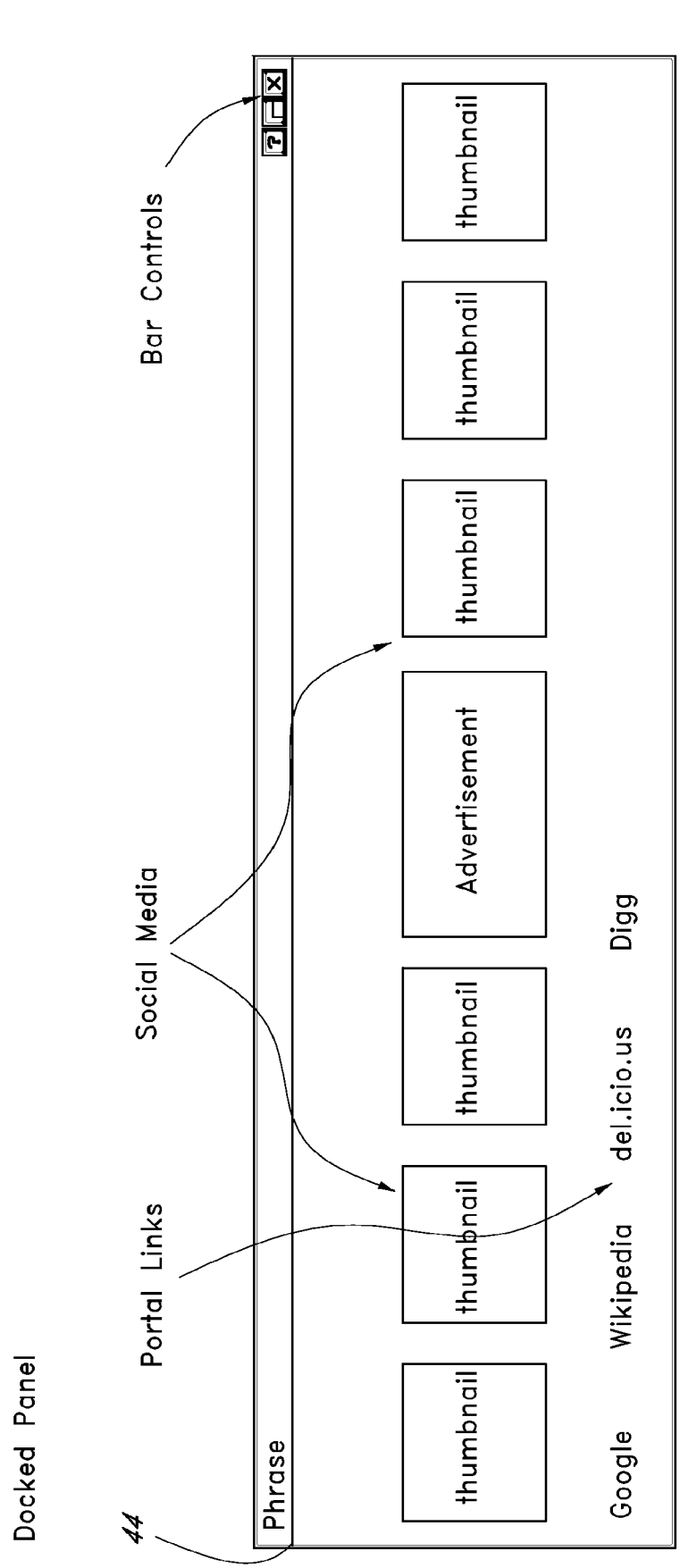

As depicted in FIG. 1, the bundled content is preferably displayed in a panel 44 that appears when the user clicks on, or in some embodiments hovers a mouse cursor over, the corresponding key phrase (which is displayed as a special link) in a web page 42 of a publisher site 34. The panel 44 preferably occupies a portion of the browser's main viewing area, such that a portion of the web page (including the key phrase) is still visible. As shown in FIGS. 2A, 2B and 3, the panel in one embodiment includes (1) an area that displays thumbnail images of videos related to the key phrase; (2) an area that displays one or more clickable advertisements related to the key phrase, and (3) an area that displays thumbnail images of one or more photos related to the key phrase. FIG. 2C illustrates the panel's configuration when it is docked at the bottom of the browser's main viewing area.

FIG. 3 illustrates how the panel 44 may be presented on a web page 42 in response to user selection of a corresponding key phrase ("Atari 2600") that has been transformed into a link. The selected key phrase is displayed at the top of the panel. The panel 44 also displays photos and video images associated with the key phrase. Because no advertisements are associated with the selected keyword phrase in this example, none are shown. If the user selects another highlighted key phrase on the page 42, the embedded JavaScript updates the panel 44 with content corresponding to that key phrase. As described below, the rate at which users click on a particular highlighted key phrase may be monitored by the system 30, and used as one factor to assess whether this key phrase should continue to be transformed into a link. This assessment may be performed at the publisher page level, the publisher site level, and/or a global level.

The videos and photos are preferably obtained from social media sites 38 such as YouTube™, Flickr™ and Myspace™, and may be obtained via interfaces to these sites or by using a crawling/scraping process. If the user clicks on a thumbnail of a video, the panel 44 expands on the screen (expanded views not shown), loads the corresponding web page from the associated social media site, and begins to play the video as displayed on that page. If the user clicks on a thumbnail image of a photo, the panel 44 expands and loads the corresponding photo page of the associated social media web site. If the user clicks on an ad, the panel expands and loads the corresponding landing page of the advertiser's web site. (As discussed below, the system tracks, and charges the corresponding advertisers for, such ad selection events.) In each of these scenarios, the user can click on additional links within the panel 44 to navigate to other content (e.g., to other videos or photos of a social media site, or to other content of the advertiser site). If the user clicks on one of the links at the bottom of the panel.

Thus, the panel 44 acts as a portal or mini browser that enables the user to access social and sponsored content without navigating away from the publisher's web page 42. Because the key phrases are selected so as to correspond to current popular topics, the sponsored and social content displayed within the panel 44 tends to be highly useful and relevant to users.

As depicted in FIG. 1, a publisher can enable the display of the panel 44 on a web page 42 by adding a tag to the web page's HTML coding. A web page that includes such a tag is referred to herein as a "panel-enabled" page 42. The tag may be a JavaScript line or sequence that causes the user's web browser 36 to request a JavaScript component from the bundle server 40 (or from another server of the system). When the browser 36 loads and executes this JavaScript component, the key phrase or phrases appearing on the web page 42 are transformed into special links that can be clicked on to cause the panel 44 to be displayed with contextually relevant content. The JavaScript component is also responsible for creating the display of the panel 44, and for populating the panel with the bundled content associated with the key phrase. In other embodiments, ActiveX™, Flash, or another type of scripting language or control may be used in place of JavaScript.

As shown in FIG. 1, the system 30 may host a web site 50 that provides functionality for advertisers to create and manage ad campaigns. One example of a process by which the advertisers create ad campaigns is described below. Advertisers may additionally or alternatively create ad campaigns via the corresponding publisher sites 34 through an interface to the system 30. The system's web site 50 may also provide functionality for publishers to register with the system to publish content served by the system.

As illustrated in FIG. 1, the system includes an indexing engine 52 that is responsible for analyzing various sources of information for purposes of selecting appropriate key phrases. The information sources preferably include the following: (1) web pages of the publisher sites 34, (2) web pages of the advertiser sites 32, (3) pages 54 (referred to as "peer pages") of sites that have direct links to, or are the target of direct links from, the publisher and advertiser sites, and (4) social media sites 38.

The indexing engine 52 is preferably invoked in two primary scenarios. The first is when an advertiser creates an ad for display on a particular publisher web site 34 or a group of publisher sites. In this scenario, the indexing engine 52 is used to select and rank key phrases to suggest to the advertiser. The second scenario is when an end user/browser 36 loads a panel-enabled page 42 of a publisher site 34. In this scenario, if the page 42 has not recently been analyzed by the indexing engine 52, the indexing engine retrieves and analyzes the web page 42 to identify key phrases to transform into links. Both of these scenarios are described below.

The vanous components of the system 30 may be implemented as executable code (software) executed by one or more general purpose computers. The components may reside at a common location, or may be distributed geographically. The software code and associated data may be stored in any type or types of computer data repository (e.g., relational databases, flat files, hard disk storage, RAM, etc.). The browsers 36 may be any conventional web browser capable of executing JavaScript. The various communications depicted in FIG. 1 and other drawings occur over the Internet and/or other computer networks.

II. Operation of Indexing Engine

Figure 4A:
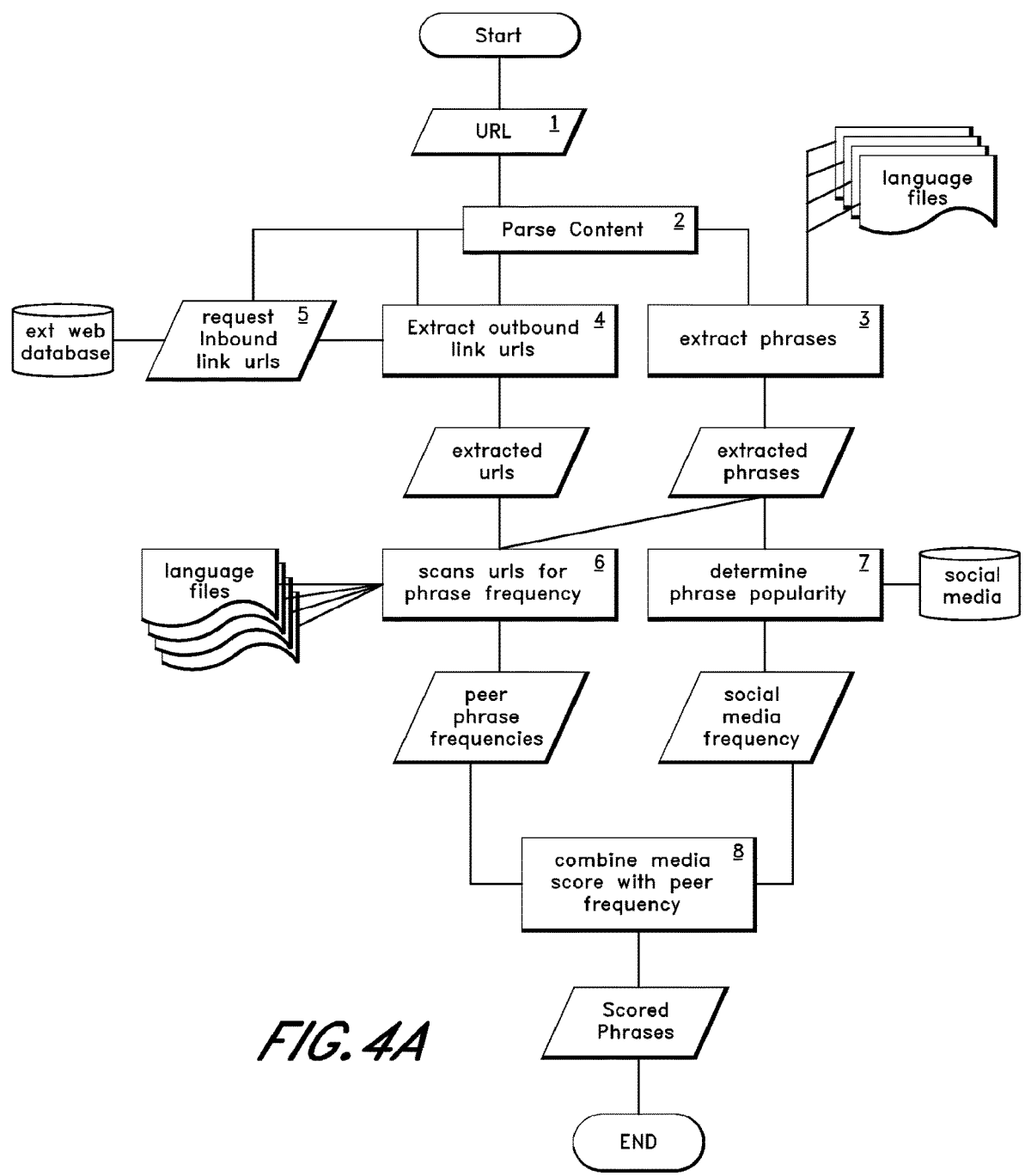
FIG. 4A illustrates one embodiment of a process that may be implemented by the indexing engine of FIG. 1 to identify key phrases that are relevant to a particular URL or page.

FIG. 4A illustrates one embodiment of a process that may be implemented by the indexing engine 52 to identify key phrases that are relevant to a particular URL or page. This process is referred to herein as "Peer-based Language Processing," or PLP, as it involves the processing of a peer group of web sites or web pages to identify relevant key phrases. As will be recognized, the process shown in FIG. 4A can be varied significantly without departing from the scope of the invention.

In block 1, the indexing engine 52 receives a URL for which to identify relevant key phrases. If the indexing process is triggered by advertiser generation of an ad, this URL is typically the advertiser-specified landing page URL of the ad. If the process is triggered by a user loading a panel-enabled web page 42 of a publisher site 34, the URL is the URL of this panel-enabled web page. For ease of description, the URL received in block 1 will be referred to as the "target URL," and the corresponding web page will be referred to as the "target page."

In blocks 2-4, the indexing engine 52 retrieves and parses the target page (block 2) to extract a set of key phrases (block 3) and a set of outbound link URLs (block 4). The key phrases are extracted in one embodiment by stripping out HTML tags, and by using one or more language files to remove stop words. As depicted by block 5, the indexing engine 52 also accesses an external service/database, such as a web service provided by Alexa Internet, to identify inbound link URLs (i.e., URLs of web pages that point to the target page and are not part of the target page's Internet domain). The inbound and outbound URLs form a "peer group" for the target URL. As mentioned below, in scenarios in which the advertiser is creating an ad campaign, the peer group may also include some or all of the web pages of the advertiser's target site 32 (i.e., the site that includes the landing page for the ad campaign).

As depicted by block 6, the indexing engine 52 retrieves and scans the content of the identified inbound and outbound URLs (and possibly additional pages of the peer group) to determine phrase frequency of the extracted phrases within the peer group. Key phrases having relatively high frequencies of occurrence across the peer group tend to best characterize the target page, and thus tend to be more useful than less-frequently-occurring key phrases for serving context-relevant content.

Figure 4B:
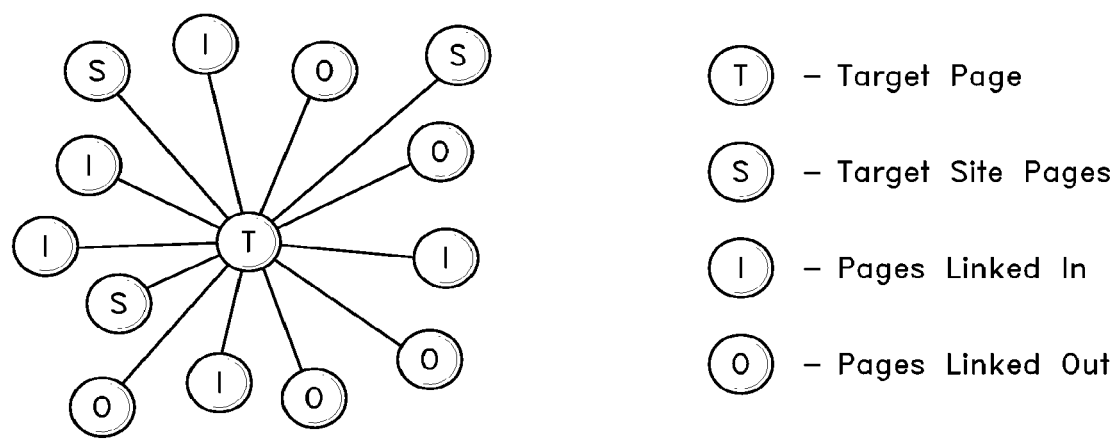
FIG. 4B depicts a peer group of web pages associated with a target page.

FIG. 4B depicts one example of a peer group that may be formed for a particular target page (T). In this example, the peer group includes three types of additional pages: (1) pages that include a link to the target page, (2) pages to which the target page includes a link, and (3) other pages of the site of the target page. Typically, the peer group will include web pages of many different web sites.

Various other methods may be used to form the peer group. For example, web usage trails of users may be analyzed in aggregate to identify other web pages that are behaviorally related to (e.g., commonly accessed during the same browsing session as) the target web page; these behaviorally related pages may then be used as, or used to supplement, the peer group.

As depicted by block 7 of FIG. 4A, the indexing engine 52 also determines the popularity levels of the extracted key phrases. This may be accomplished by, for example, determining the frequencies with which the extracted key phrases appear within a repository of social media content, and/or determining how often media related to these key phrases is viewed. This may be accomplished by, for example, scanning an index of one or more social media web sites 38. Scraping methods can also be used to extract view counts for particular videos, pictures, and other content items on the social media sites 38. Key phrases that appear relatively frequently in the social media and/or relate to content that is frequently viewed typically correspond to relatively popular subjects and topics, and thus tend to be more useful than the less-frequently-occurring key phrases. The social media sites 38 may be separate and distinct from the advertiser sites 32 and publisher sites 34.

The popularity levels of the key phrases may additionally or alternatively be assessed using other sources of information. For example, the key phrase popularity levels can be assessed by analyzing search query logs of an Internet search engine, a social media site, and/or a news site. As another example, a service such as Google™ Trends may be used to assess key phrase popularity trends, so that key phrases rapidly gaining in popularity can be given more weight.

In addition, some social media sites 38 include publicly accessible APIs that provide access to usage statistics regarding the frequencies with which particular key phrases are used to tag, or are used to search for, particular photos, videos or other content items on a social media site. You-Tube.com is one example of a social media site that provides such an API. These APIs may be used as an additional or alternative source of information for assessing the key phrase popularity levels in block 7.

Figure 4C:
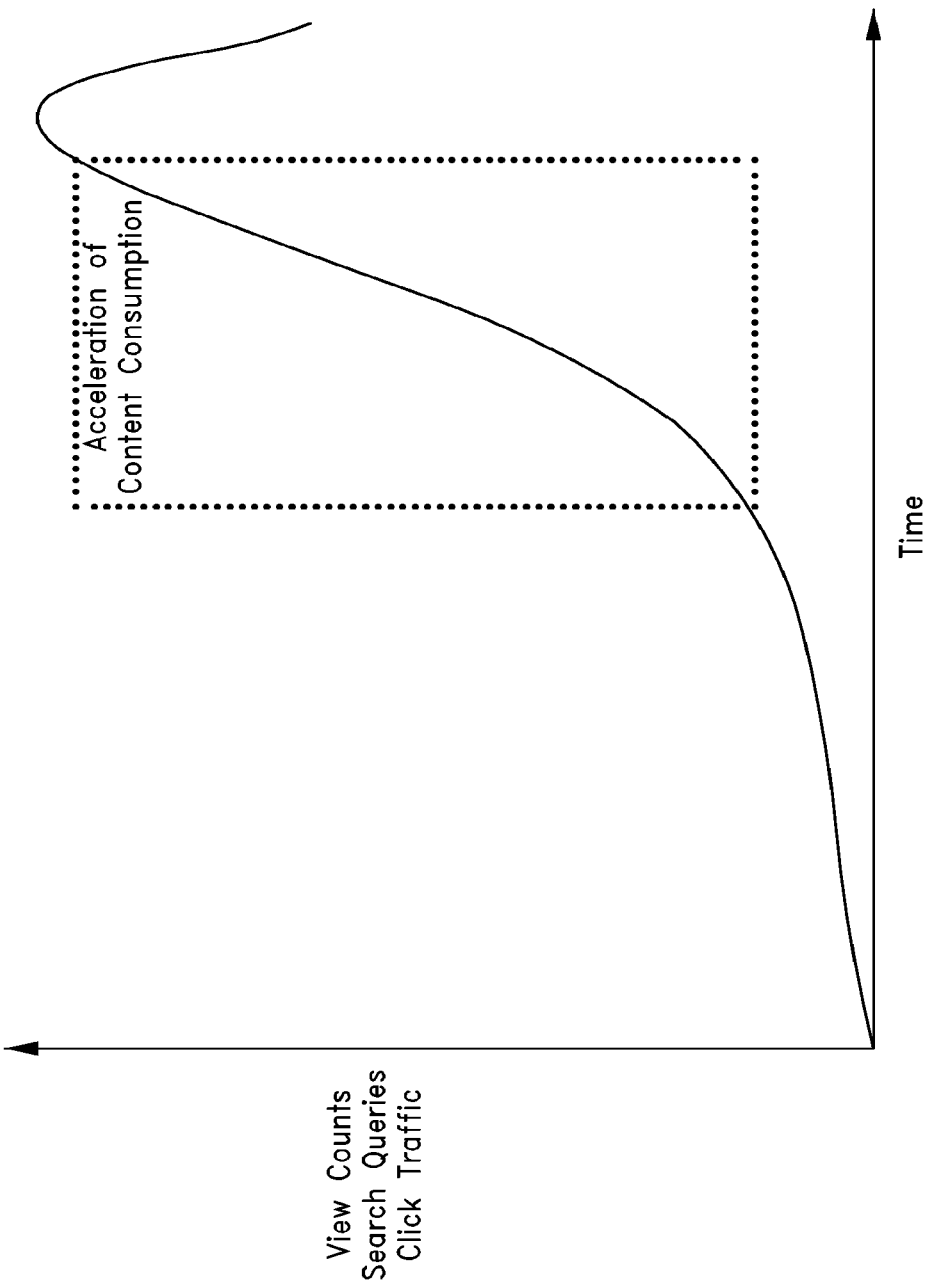
FIG. 4C illustrates a user-activity-based method for selecting key phrases to use for serving contextually-relevant content.
Figure 5:
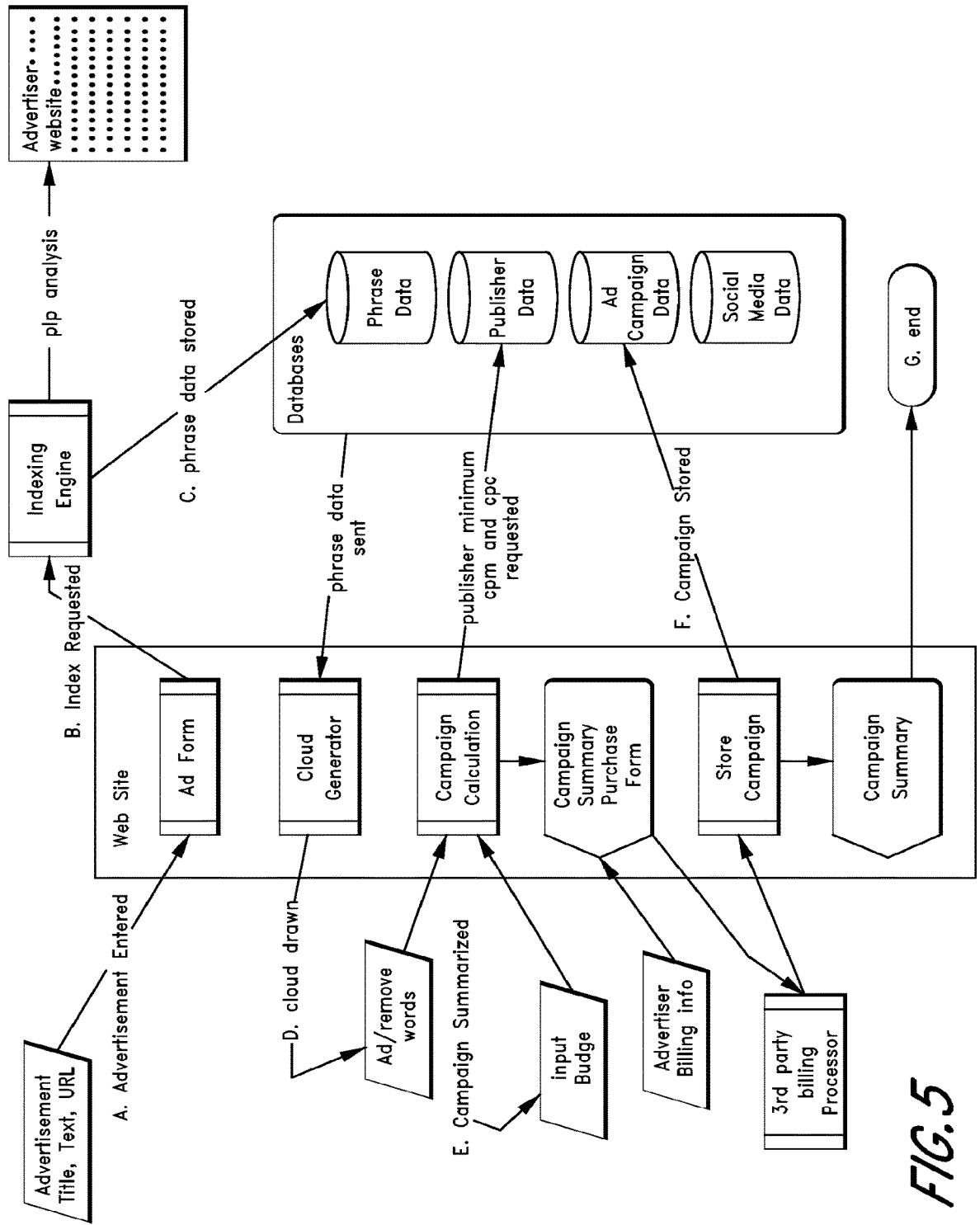
FIG. 5 illustrates one embodiment of a process performed by the system of FIG. 1 when an advertiser creates and ad campaign.

For example, each key phrase may be scored or assessed based (or based in-part) on its acceleration (i.e., the rate at which it is gaining in popularity) in social media sites, or based on another popularity metric, as determined via a mathematical scoring model that examines user activity over time. One example of such a model is depicted in FIG. 4C. This figure depicts a graph representing the popularity level of a particular key phrase over time. The vertical axis in this example represents the current popularity level of the key phrase as measured by one, or any combination of, the following metrics: (1) the view count associated with one or more corresponding media items (videos, photos, etc.) on a social media site or group of sites 38, (2) the number of times the key phrase has been submitted as a search query to one or more Internet search engines, (3) the number of times the key phrase, as transformed into links on publisher sites 34 as described above, has been selected. Each of these metrics (1)-(3) may be based on a most recent window or dataset of user activity data, such as the last 3 days of user activity. The dashed box in FIG. 4C represents the period of time during which the key phrase should generally be transformed into links on the publisher sites 34. Specifically, as the key phrase is rapidly gaining in popularity, the system 30 may score the key phrase relatively highly to increase the probability that it will be selected for use in targeting content. As the acceleration begins to decline, the system 30 may assign a lower popularity score that decreases the key phrase's probability of use. Rather than using a phrase scoring method, hard cutoffs could be used to enable and disable the key phrase's use.

In block 8, each extracted key phrase is scored by combining its peer frequency with its social media frequency/popularity. An appropriate weighting method may optionally be used to give more weight to one type of content (peer versus social) than the other. Various other criteria may also be incorporated into the scores. For example, key phrases that appear relatively infrequently across the entire web (or some other reference document collection) may be scored more highly on the basis that they better distinguish the peer group from the web or reference document collection as a whole. As another example, relatively popular web pages in the peer group, and/or relatively popular social content items, may be weighted more heavily in measuring key phrase frequency.

The output of the indexing engine 52 is a set of name/value pairs representing the extracted key phrases and their respective scores. These name/value pairs are stored in a database 60 of the system in association with the target URL. The most highly scored key phrases tend to be relatively popular key phrases that characterize the target site or page, and which are the most useful for selecting contextually relevant content.

Figure 7:
FIG. 7 illustrates how selected key phrases may be presented to the advertiser via a campaign cloud interface in the process of FIG. 5.

If the target URL is a landing page of an advertisement, the extracted key phrases with the highest scores are suggested to the advertiser as part of a "campaign cloud" (see FIG. 7, discussed below). In this scenario, the scores are preferably used to set corresponding CPC (cost per click) and CPM (cost per thousand) rates for charging the advertiser for ad click-through events. If, on the other hand, the target page is a panel-enabled page 42 of a publisher site 34, the extracted phrases and scores are used by the system 30 to select specific key phrases to display on the target page as special links.

As mentioned above, in ad generation scenarios in which the advertiser designates a particular publisher site 34, the process shown in FIG. 4A may be varied to include the advertiser's target site in the peer group of the publisher. This increases the likelihood that the extracted phrases suggested to the advertiser are phrases that actually appear (and ideally appear reasonably frequently) on the advertiser site 32.

As will be recognized, the PLP process described above can be used in a wide range of applications, including applications that do not involve the display of bundled content, and including applications in which the key phrases on the publisher page are not converted into special links. The present invention encompasses such applications. As one example, the PLP process can be used in Google™ AdSense™ type applications in which ads are displayed in a designated area of the publisher web page.

III. Advertiser Use (FIGS. 5-10)

The process by which an advertiser interacts with the system to create an ad campaign will now be described with reference to FIGS. 5-10. As represented by event A in FIG. 5, the advertiser initially uses an advertisement form page 62 of the system 30 to create an ad. An example of such a form page is shown in FIG. 6. The ad preferably includes an ad title, ad text, and the URL of a landing page. In this example, the ad form is branded with the logo of a corresponding publisher, and the ad is being created specifically for display by this publisher.

In event B, the indexing engine is invoked to generate a set of key phrases and associated scores for the designated landing page. This may be accomplished using the process shown in FIG. 4A, discussed above. The results are stored in a database 60 (event C) in association with the advertisement.

In event D, a web page depicting a resulting "campaign cloud" is generated and displayed to the advertiser. An example of such a display is shown in FIG. 7. In this display, the size of each key phrase is directly proportional to its score. The phrases with the lowest scores, or which have scores falling below a selected threshold, may be omitted from the cloud. The controls displayed with the campaign cloud enable the advertiser to add and remove key phrases.

While viewing the campaign cloud, the advertiser can "mouse over" a key phrase to view its estimated average CPC and average CPM. These values are preferably calculated based on the publisher's minimum CPC and CPM values, and based further on the key phrase scores. CPM and CPC rates are calculated by simplifying the phrase scores to a scale of 1-10 and multiplying the base cost set by the publisher by the score. For example, a publisher specifying a base CPM of $0.50 will equate to a $5.00 CPM for the most popular phrases in its peer group. Market trend data, publisher traffic statistics and category information may be factored into the CPM value as well. Phrases entered by the advertiser will be added to the cloud with their corresponding scores on the publisher site. If no score exists or the phrase does not exist on the publisher site, the phrase is assigned the publisher's minimum cost.

Upon proceeding from the campaign cloud page (event E in FIG. 5), the advertiser is presented with a campaign summary page. An example of such a summary page is shown in FIG. 8. Using this page, the advertiser enters and submits a desired budget. The advertiser then proceeds to a campaign summary purchase form (FIG. 9) and specifies payment information. Upon completion of the payment process, the details of the campaign are stored in an ad campaign database (event F).

Figure 10:
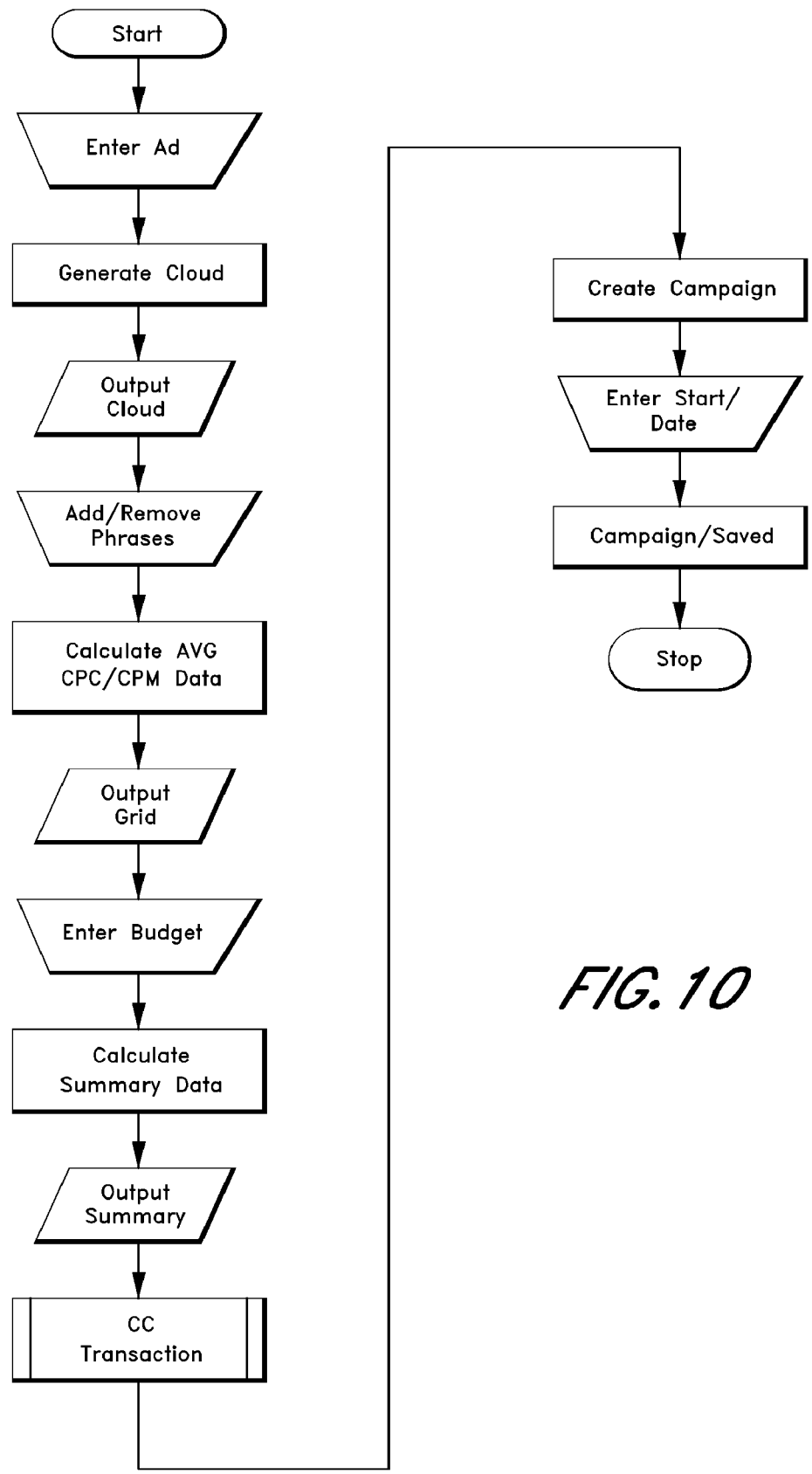
FIG. 10 summarizes the process depicted by FIGS. 5-9.

The above-described process by which the advertiser interacts with the system to create an ad campaign is summarized in FIG. 10.

IV. Browser Loading of Panel-Enabled Page (FIG. 11)

Figure 11:
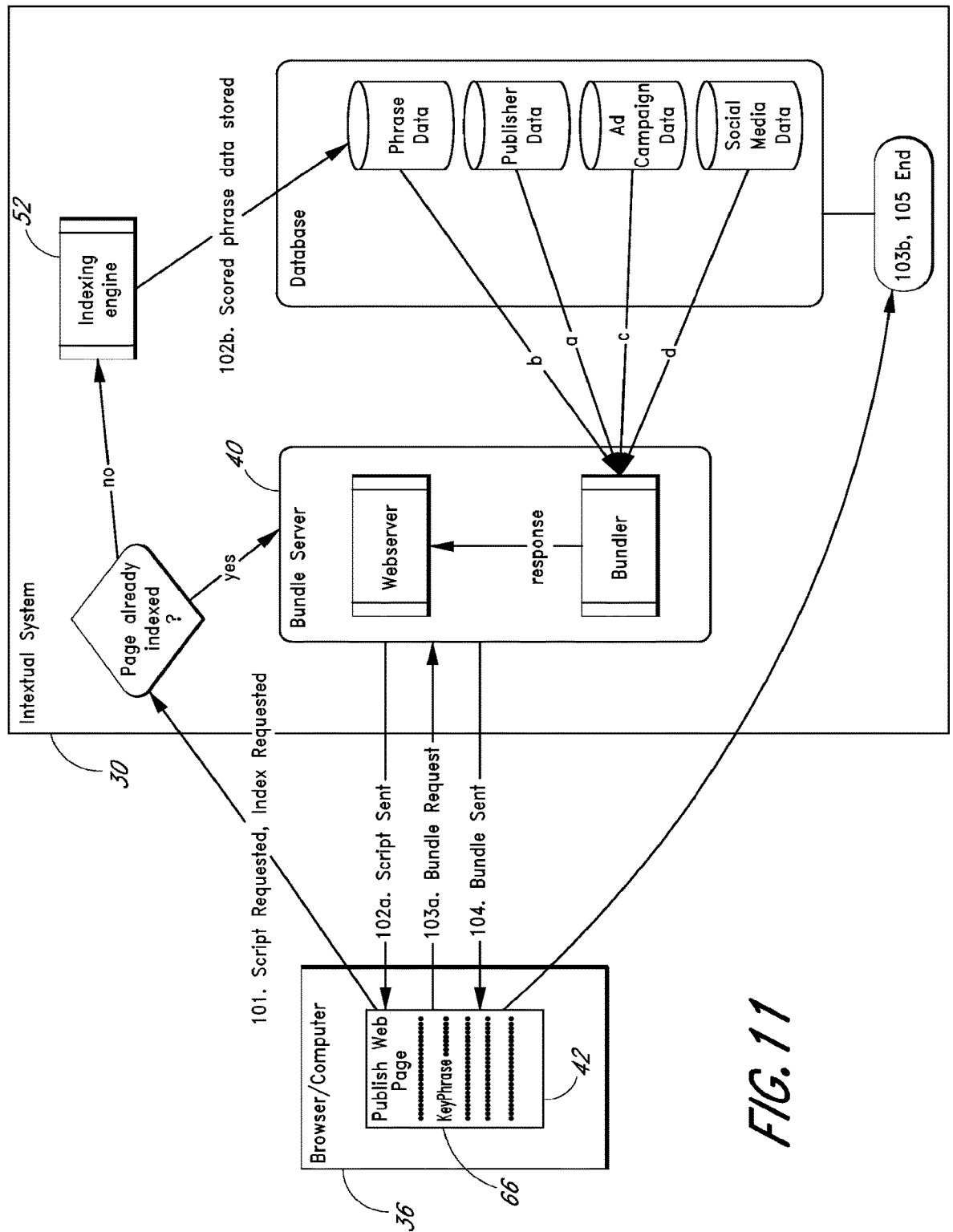
FIG. 11 illustrates one embodiment of a process that occurs when an end user loads a panel-enabled web page of a publisher site 34.

FIG. 11 illustrates the process that occurs when an end user loads a panel-enabled web page 42 of a publisher site 34. In event 101, the tag included in the page causes the user's browser/computer 36 to send a request to the system 30. In response to this request, the system 30 accesses a database to determine whether the page is already indexed. If the page is already indexed, the bundle server 40 returns a cacheable JavaScript component to the browser (event 102a). This JavaScript requests the key phrases associated with this page, and causes the browser 36 to transform any occurrences of these key phrases into special links.

If the page is not indexed, the system invokes the indexing engine 52, which generates a dataset of key phrases and associated scores. This dataset is stored in a database 60 (event 102b) in association with the URL of the panel-enabled page, and is maintained therein for a selected period of time (e.g., 1 day or 1 week). Once the indexing is completed in this scenario, the process ends (i.e., no panel is generated).

Returning to the scenario in which the page is already indexed, if a user clicks on one of the special links/key phrases 66 (one shown in FIG. 11), the previously loaded JavaScript causes the browser 36 to send a bundle request to the bundle server 40 (event 3a). (This request may alternatively be made in advance of user selection of a special link, and maintained hidden within the web page unless/until the user selects a special link.) This request identifies the URL of the web page 42 being viewed, and may also identify the particular key phrase 66 selected. The bundle server 40 responds to this request by identifying the key phrases associated with the publisher web page, identifying ads associated with these key phrases (excluding any that do not meet criteria pre-specified by the publisher), and by identifying the most popular social media items that match these keyword phrases. The bundle server then assembles the ads, key phrases and social media items (or thumbnails thereof) into a bundle, and returns the bundle to the web browser 36 (event 104). A separate bundle request may alternatively be generated for each key phrase/link 66 selected by the user.

The JavaScript displays the panel on an independent graphic layer of the web page 42, and loads the panel 44 with the bundle content associated with the key phrase selected by the user. If the user thereafter selects a different key phrase/special link on the page, the panel is reloaded with the bundle content associated with that key phrase. The JavaScript may also be configured to draw ads and related content within other ad units.

The foregoing description of specific embodiments does not limit the invention in any way. Other embodiments and applications that are apparent to those of ordinary skill in the art, including embodiments that do not provide all of the features and advantages set forth herein, are also within the scope of this invention. The scope of the present invention is intended to be defined only by reference to the following claims. Applicants also reserve the right to pursue additional claims that are supported by the present disclosure, including claims of broader scope.

What is claimed is:

1. A method, comprising:
inputting content of a digital page associated with requested content into a parser resource, wherein the digital page comprises a first digital page of a first domain;
identifying a set of key phrases from the first digital page based on an output of the parser resource;
analyzing the identified set of key phrases using an indexing engine performing peer-based language processing, wherein an output of the indexing engine includes a selection of at least one key phrase from the set of key phrases for transformation into a link;
identifying a bundle of content associated with the at least one key phrase, wherein the bundle of content includes social media or other content associated with the at least one key phrase, wherein the social media or other content is from one or more second digital pages of a second domain that is different than the first domain;
displaying the requested content in a viewing area of an application based on a result of the analyzing, the displaying including transforming the selected at least one key phrase into the link, wherein the link is depicted in the displayed content in the viewing area as a representation of the key phrase and is individually user-selectable in the displayed content to enable browsable access to part of the identified bundle of content, including browsable access to the one or more second digital pages, without navigating away from the first digital page, in which:
  user-selected content is displayed in at least a part of the viewing area over at least a portion of the displayed content; and
  at least one portal link displayed in said at least the part of the viewing area to enable browsable access to additional content, including browsable access to at least one portal corresponding to the at least one portal link, without navigating away from the first digital page.

2. The method of claim 1, wherein the additional content includes content different than content of the bundle of content.

3. The method of claim 1, further comprising:
determining frequencies with which the key phrases of the set appear within a repository of social media content;
wherein the selection of at least one key phrase from the set of key phrases for transformation into the link is based on a result of the determining and the at least one key phrase has a greater frequency of appearance within the repository than other key phrase(s) of the set of key phrases.

4. The method of claim 1, further comprising:
determining how often media related to key phrases of the set is accessed;
wherein the selection of at least one key phrase from the set of key phrases for transformation into the link is based on a result of the determining.

5. The method of claim 1, further comprising:
identifying one or more outbound links of the first digital page; and
forming a peer group using the one or more outbound links, wherein the selection of the at least one key phrase from the set of key phrases for transformation into the link is based on processing content of the peer group using the indexing engine.

6. The method of claim 1, further comprising:
identifying one or more inbound links of one or more third digital pages that point to the first digital page; and
forming a peer group using the one or more inbound links, wherein the selection of the at least one key phrase from the set of key phrases for transformation into the link is based on processing content of the peer group using the indexing engine.

7. The method of claim 1, further comprising:
identifying one or more outbound links of the first digital page;
identifying one or more inbound links of one or more third digital pages that point to the first digital page;
wherein the outbound and inbound links form a peer group, and wherein the selection of the at least one key phrase from the set of key phrases for transformation into the link is based on processing content of the peer group using the indexing engine.

8. The method of claim 1, wherein the selection of the at least one key phrase from the set of key phrases for transformation into the link is based at least in part on view counts of social media content items associated with the at least one key phrase, the social media content items being accessible to users of a social media service.

9. An apparatus, comprising:
means for parsing content of a digital page associated with requested content to identify a set of key phrases from the digital page, wherein the digital page comprises a first digital page of a first domain;
means for peer-based language processing the identified set of key phrases to select at least one key phrase from the set of key phrases for transformation into a link, wherein the at least one key phrase is associated with a bundle of content including social media or other content associated with the at least one key phrase, wherein the social media or other content is from one or more second digital pages of a second domain that is different than the first domain; and
means for transforming the selected at least one key phrase into the link to display the requested content in a viewing area of an application, wherein the link is depictable in the displayed content in the viewing area as a representation of the key phrase and is individually user-selectable in the displayed content to enable browsable access, to part of the identified bundle of content, including browsable access to the one or more second digital pages, without navigating away from the first digital page, in which:
  user-selected content is displayed in at least a part of the viewing area over at least a portion of the displayed content; and
  at least one portal link displayed in said at least the part of the viewing area to enable browsable access to additional content, including browsable access to at least one portal corresponding to the at least one portal link, without navigating away from the first digital page.

10. The apparatus of claim 9, wherein the peer-based language processing means is configured to identify a peer group including the first digital page and one or more third digital pages that have direct links to, or are a target of direct links from, the first digital page;
wherein the at least one key phrase has a greater frequency of occurrence across the peer group than other key phrase(s) of the set of key phrases.

11. The apparatus of claim 9, wherein peer-based language processing means is configured to determine frequencies with which the key phrases of the set appear within a repository of social media content; and wherein the at least one key phrase has a greater frequency of appearance within the repository than other key phrase(s) of the set of key phrases.

12. The apparatus of claim 9, wherein peer-based language processing means is configured to determine how often media related to key phrases of the set is accessed.

13. The apparatus of claim 9, wherein the peer-based language processing means is configured to identify one or more outbound links of the first digital page and form a peer group using the one or more outbound links.

14. The apparatus of claim 9, wherein the peer-based language processing means is configured to identify or more inbound links of one or more third digital pages that point to the first digital page and form a peer group using the one or more inbound links.

15. The apparatus of claim 9, wherein the peer-based language processing means is configured to identify one or more outbound links of the first digital page and one or more inbound links of one or more third digital pages that point to the first digital page and form a peer group using the outbound and inbound links.

16. The apparatus of claim 9, wherein peer-based language processing means is configured to select the at least one key phrase from the set of key phrases for transformation into the link is based at least in part on view counts of social media content items associated with the at least one key phrase, the social media content items being accessible to users of a social media service.

17. A system including one or more hardware devices, wherein a hardware device of the one or more hardware devices comprises memory having instructions stored thereon that, in response to execution by a processing device, cause the hardware system to perform operations comprising:

inputting content of a digital page associated with requested content into a parser resource, wherein the digital page comprises a first digital page of a first domain;

identifying a set of key phrases from the first digital page based on an output of the parser resource;

analyzing the identified set of key phrases using an indexing engine performing peer-based language processing, wherein an output of the indexing engine includes a selection of at least one key phrase from the set of key phrases for transformation into a link; and identifying a bundle of content associated with the at least one key phrase, wherein the bundle of content includes social media or other content associated with the at least one key phrase, wherein the social media or other content is from one or more second digital pages of a second domain that is different than the first domain;

displaying the requested content in a viewing area of an application based on a result of the analyzing, the displaying including transforming the selected at least one key phrase into the link, wherein the link is depicted in the displayed content in the viewing area as a representation of the key phrase and is individually user-selectable in the displayed content to enable browsable access to part of the identified bundle of content, including browsable access to the one or more second digital pages, without navigating away from the first digital page in which:

user-selected content is displayed in at least a part of the viewing area over at least a portion of the displayed content; and at least one portal link displayed in said at least the part of the viewing area to enable browsable access to additional content, including browsable access to at least one portal corresponding to the at least one portal link, without navigating away from the first digital page.

18. The system of claim 17, wherein the operations further comprise:

processing, using the indexing engine, a peer group including the first digital page and one or more third digital pages that have direct links to, or are a target of direct links from, the first digital page;

wherein the selection of at least one key phrase from the set of key phrases for transformation into the link is based on a result of the processing of the peer group and the at least one key phrase has a greater frequency of occurrence across the peer group than other key phrase(s) of the set of key phrases.

19. The system of claim 17, wherein the operations further comprise:

determining frequencies with which the key phrases of the set appear within a repository of social media content;

wherein the selection of at least one key phrase from the set of key phrases for transformation into the link is based on a result of the determining and the at least one key phrase has a greater frequency of appearance within the repository than other key phrase(s) of the set of key phrases.

20. The system of claim 17, wherein the operations further comprise:

determining how often media related to key phrases of the set is accessed;

wherein the selection of at least one key phrase from the set of key phrases for transformation into the link is based on a result of the determining.

* * * * *